(12) United States Patent
Adams

(10) Patent No.: US 11,692,638 B2
(45) Date of Patent: Jul. 4, 2023

(54) ACTUATOR

(71) Applicant: ROTORK CONTROLS LIMITED, Bath (GB)

(72) Inventor: David Adams, Bath (GB)

(73) Assignee: ROTORK CONTROLS LIMITED, Bath (GB)

(*) Notice: Subject to any disclaimer, the term of this patent is extended or adjusted under 35 U.S.C. 154(b) by 0 days.

(21) Appl. No.: 17/415,927

(22) PCT Filed: Dec. 16, 2019

(86) PCT No.: PCT/GB2019/053563
§ 371 (c)(1),
(2) Date: Jun. 18, 2021

(87) PCT Pub. No.: WO2020/128443
PCT Pub. Date: Jun. 25, 2020

(65) Prior Publication Data
US 2022/0065361 A1 Mar. 3, 2022

(30) Foreign Application Priority Data

Dec. 21, 2018 (GB) .................................... 1821097
Jul. 26, 2019 (GB) .................................... 1910743

(51) Int. Cl.
*F16K 31/04* (2006.01)
*F16K 27/12* (2006.01)
(Continued)

(52) U.S. Cl.
CPC ............ *F16K 31/047* (2013.01); *F16K 27/12* (2013.01); *F16K 31/05* (2013.01); *F16K 31/50* (2013.01); *F16K 31/53* (2013.01)

(58) Field of Classification Search
CPC .... F16K 31/042; F16K 31/043; F16K 31/045; F16K 31/046; F16K 31/047;
(Continued)

(56) References Cited

U.S. PATENT DOCUMENTS 2,992,807 A * 7/1961 Karlby .................. F16K 31/047
251/76
3,327,826 A * 6/1967 Henschke ............. F16K 31/047
74/89.34
(Continued)

FOREIGN PATENT DOCUMENTS

EP    0364308  A2    4/1990
EP    3026373  A1    6/2016
(Continued)

*Primary Examiner* — Kevin F Murphy
*Assistant Examiner* — Jonathan J Waddy
(74) *Attorney, Agent, or Firm* — Dickinson Wright PLLC; Andrew D. Dorisio

(57) ABSTRACT

An actuator (1) comprising a motor (2) assembly, a drive coupling (113, 13, 313) assembly and an actuator shaft (114, 14). The motor (2) assembly comprising a motor housing (120, 20), having a cover (122, 22) and a base (123, 23); an electric motor (111, 11, 211, 2), comprising an external stator (111, 11, 211) and an internal rotor (112, 12); and a hollow output shaft (130, 30, 330) that is connected co-axially with the internal rotor (112, 12) such that rotation of the internal rotor (112, 12) causes a corresponding rotation of the hollow output shaft (130, 30, 330). The drive coupling (113, 13, 313) assembly comprises a drive coupling housing (115, 15, 315) containing a drive coupling (113, 13, 313), wherein the drive coupling (113, 13, 313) engages the hollow output shaft (130, 30, 330) such that rotation of the hollow output shaft (130, 30, 330) causes a corresponding rotation of the (Continued)

drive coupling (113, 13, 313). The actuator shaft (114, 14) extends through the hollow output shaft (130, 30, 330) and the internal rotor (112, 12), and engages the drive coupling (113, 13, 313) such that rotation of the drive coupling (113, 13, 313), by the hollow output shaft (130, 30, 330), causes the actuator shaft (114, 14) to move axially.

27 Claims, 10 Drawing Sheets

(51) Int. Cl.
  *F16K 31/05* (2006.01)
  *F16K 31/50* (2006.01)
  *F16K 31/53* (2006.01)

(58) Field of Classification Search
  CPC ...... F16K 31/048; F16K 31/055; F16K 31/05; F16K 31/50; F16K 31/53; F16K 27/12
  USPC ........................................ 251/129.11–129.13
  See application file for complete search history.

(56) References Cited

U.S. PATENT DOCUMENTS

| | | | | |
|---|---|---|---|---|
| 5,295,907 | A * | 3/1994 | Akkerman | F16K 31/04 |
| | | | | 464/30 |
| 5,356,112 | A * | 10/1994 | Simar | F16K 11/083 |
| | | | | 251/129.05 |
| 5,848,610 | A * | 12/1998 | Livernash | F16K 11/072 |
| | | | | 137/625.46 |
| 2003/0121714 | A1 | 7/2003 | Okada | |
| 2007/0068583 | A1* | 3/2007 | Johnson | F16K 27/045 |
| | | | | 137/625.31 |
| 2009/0206290 | A1* | 8/2009 | Wygnanski | H02K 7/14 |
| | | | | 251/129.15 |
| 2013/0068976 | A1* | 3/2013 | Esveldt | F16K 31/047 |
| | | | | 137/553 |
| 2016/0279850 | A1* | 9/2016 | Lee | F16K 31/047 |
| 2019/0032806 | A1* | 1/2019 | Eriksen | F16H 25/2252 |

FOREIGN PATENT DOCUMENTS

| | | |
|---|---|---|
| GB | 862324 A | 3/1961 |
| WO | WO2011161394 A1 | 12/2011 |
| WO | WO-2017138816 A1 * | 8/2017 ........... E21B 33/035 |

* cited by examiner

ACTUATOR

FIELD OF INVENTION

The present invention relates to actuators such as valve actuators, and particularly to electric motor operated valve actuators. The invention also relates to systems comprising valves and actuators, and to electric motors for use in such actuators or systems.

BACKGROUND OF INVENTION

Electric valve actuators are control devices widely used in a large number of industries including the process control industry for managing fluid and gas flow. Such actuators use electric motors to transform electrical energy into mechanical motion to operate fluid control valves.

When electric valve actuators are used to operate heavy-duty industrial valves, a large torque may need to be exerted on the valve. As electric motors capable of directly providing sufficient torque for such operations may be inconveniently large, electric motors with lower torques can be used with geared drivetrains (often worm gears) configured to increase torque while reducing output speed. The use of such gears to transmit power from the electric motor to the valve increases mechanical complexity as more moving parts are involved. Geared electric valve actuators can therefore suffer from reduced efficiency from friction losses, reduced precision from gear backlash, wear/lubrication/maintenance issues and increased noise. The drivetrain also occupies space in the actuator housing leading to a larger overall size.

There is therefore a need for a valve actuator comprising an electric motor capable of compact assembly within the valve actuator housing and capable of providing sufficient torque to operate heavy-duty industrial valves without a large geared drivetrain.

EP 3026373 A1 (TGK CO), EP 0364308 A2 (SNEDDON) and GB 862324 A (ATOMIC ENERGY AUTHORITY UK) disclose motor operated valve actuators.

SUMMARY OF INVENTION

One aspect of the invention provides an actuator comprising a motor assembly, a drive coupling assembly and an actuator shaft. The motor assembly comprising a motor housing, having a cover and a base; an electric motor, within the motor housing, comprising an external stator and an internal rotor; and a hollow output shaft that is connected coaxially with the internal rotor such that rotation of the internal rotor causes a corresponding rotation of the hollow output shaft. The drive coupling assembly comprises a drive coupling housing containing a drive coupling, wherein the drive coupling engages the hollow output shaft such that rotation of the hollow output shaft causes a corresponding rotation of the drive coupling; and wherein the drive coupling assembly is connected to the base of the motor housing. The actuator shaft engages the drive coupling such that rotation of the drive coupling, by the hollow output shaft, causes the actuator shaft to move.

The drive coupling assembly can be external to the motor housing. For example, the electric motor can be on one side of the base of the motor housing (on the internal side of the motor housing) and the drive coupling assembly can be on the other side of the base of the motor housing (external to the motor housing).

The connection between the drive coupling assembly and the motor housing can be releasable. For example, the drive coupling assembly and the motor housing can be connected to each other via at least one removable fixing element (e.g. a bolt).

The hollow output shaft can directly engage the drive coupling or can engage the drive coupling through an arrangement of gears. The arrangement of gears can comprise a gearbox, and the drive coupling assembly can be connected to the base of the motor housing by means of the gearbox. The gearbox can contain a planetary gear arrangement including a sun gear and planet gears mounted on a rotary gear carrier, wherein the sun gear is hollow and coaxial with the hollow output shaft and the actuator shaft, and rotation of the hollow output shaft can be transmitted to the actuator shaft by rotation of the rotary gear carrier. The planetary gear arrangement can be a multi-stage planetary gear arrangement.

The drive coupling can comprise an anti-back drive coupling.

The actuator shaft can extend through the hollow output shaft and the internal rotor. In this case, rotation of the drive coupling can cause the actuator shaft to move axially.

The rotation of the internal rotor can be transmitted to the drive coupling via engagement of an at least one axially-extending lug and an at least one corresponding cut-out formed in respective parts of the hollow output shaft and drive coupling. This engagement can allow the motor assembly to be easily moved away from the drive coupling assembly and the actuator shaft (e.g. for maintenance), as the lug(s) and cut-out(s) can be disengaged by simply moving the motor assembly axially away from the drive coupling assembly once the connection between the drive coupling assembly and the motor housing has been released. Moreover, this can be done without affecting the position of the actuator shaft as the connection between the actuator shaft and the motor assembly is only indirectly via the drive coupling assembly.

The hollow output shaft can be mounted within the internal rotor and extend through the internal rotor.

The cover and base of the motor housing can define an internal tube and the internal rotor can be mounted on bearings on the tube.

The cover and base of the motor housing can be secured in a spaced arrangement by locating members extending between peripheral regions of the cover and base of the motor housing. In this case, bearings can be provided in the cover and base of the motor housing to mount the internal rotor for rotation. Additionally, the hollow output shaft can have an external flange at its upper region, and the hollow output shaft can be mounted within the internal rotor by means of the flange, and an upper surface of the flange engages the bearing in the upper portion of the housing.

The cover of the motor housing can extend from the base of the motor housing around the stator and the rotor.

The cover of the motor housing can have open regions, the motor housing further comprising a removable lid that can be secured to the external surface of cover of the motor housing to close the open regions.

The actuator can comprise an actuator housing within which actuator components are secured and defining the motor housing onto which the external stator and internal rotor are directly mounted. Alternatively, the actuator housing can define the drive coupling housing, and for example, the actuator housing can enclose the motor assembly.

The actuator can comprise a valve housing, within which valve components are secured, that defines the drive coupling housing.

The drive coupling can be an internally threaded drive nut, a ball screw nut or a roller screw nut that engages a thread on the exterior of the actuator shaft. The drive coupling can comprise an anti-back drive coupling The external stator, internal rotor, hollow output shaft, drive coupling and actuator shaft can be arranged coaxially. For example, internal rotor, hollow output shaft, and the drive coupling can have a common axis of rotation.

The external stator can comprise a stator body having a series of inwardly projecting teeth, a winding being provided around each tooth. In this case, the sides of the stator teeth can be substantially straight along the whole length of the tooth. Electric motors having this feature can also be used in other applications.

The external stator can be held in position by engagement with the cover and base of the motor housing.

The drive coupling housing can be fixed relative to a lower surface of the lower portion. The actuator can further comprise a bearing assembly between the drive coupling and the drive coupling housing such that the drive coupling is allowed to rotate relative the drive coupling housing.

Another aspect of the invention provides a system comprising an actuator according to the first aspect, and a valve connected to the actuator.

The actuator shaft can be directly connected to the valve.

A further aspect of the invention provides a system comprising an actuator according to the first aspect, wherein the actuator shaft is a threaded valve stem comprising a valve at its lower end.

A further aspect of the invention provides an electric motor for use in an actuator or a system as defined above, comprising an external stator and an internal rotor, wherein the external stator comprises a stator body having a series of inwardly projecting teeth, a winding being provided around each tooth; and wherein the sides of the stator teeth are substantially straight along the whole length of the tooth.

Further variants are disclosed in the following description.

DETAILED DESCRIPTION

Figure 1:
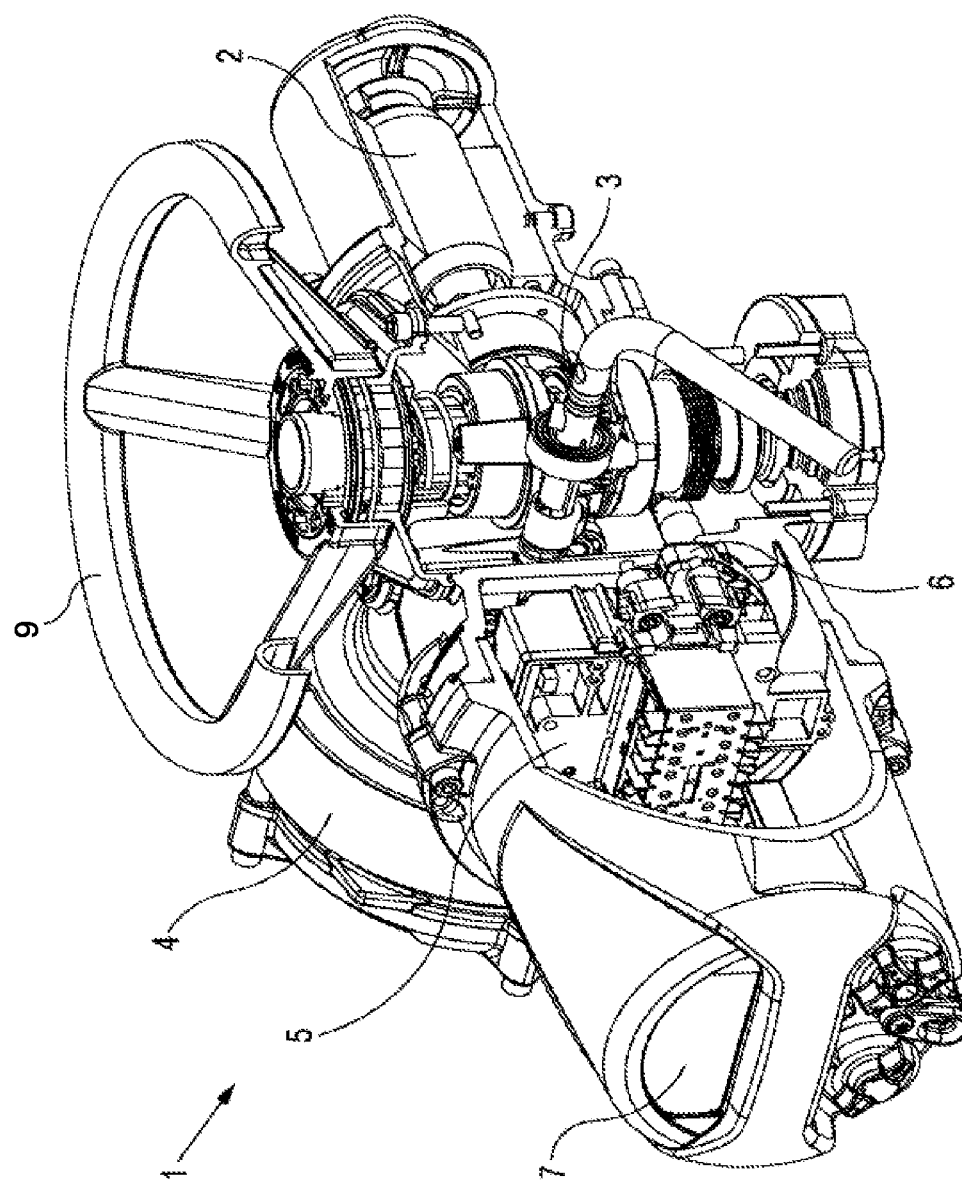
FIG. 1 illustrates a part section view of an electric valve actuator.

FIG. 1 shows a part section view of an electric valve actuator 1, comprising an electric motor 2 (for example, a brushless DC electric motor or an AC induction motor) for electric powered operation of a valve (not shown); a drivetrain 3 that connects the motor 2 to the valve (for example, via a worm gearing); a terminal compartment 4 for electrical power and data signal connections; an actuator control unit 5 for processing command signals and actuator signals for controlling actuator operations; a position control unit 6 connected to the drivetrain; and a display 7 and local controls 8 for locally viewing and configuring the operation of the actuator 1. A hand wheel 9 for manual operation of the valve in emergency situations (e.g. when the electric motor 2 is malfunctioning or when no mains power is available) can also be provided.

Figure 2:
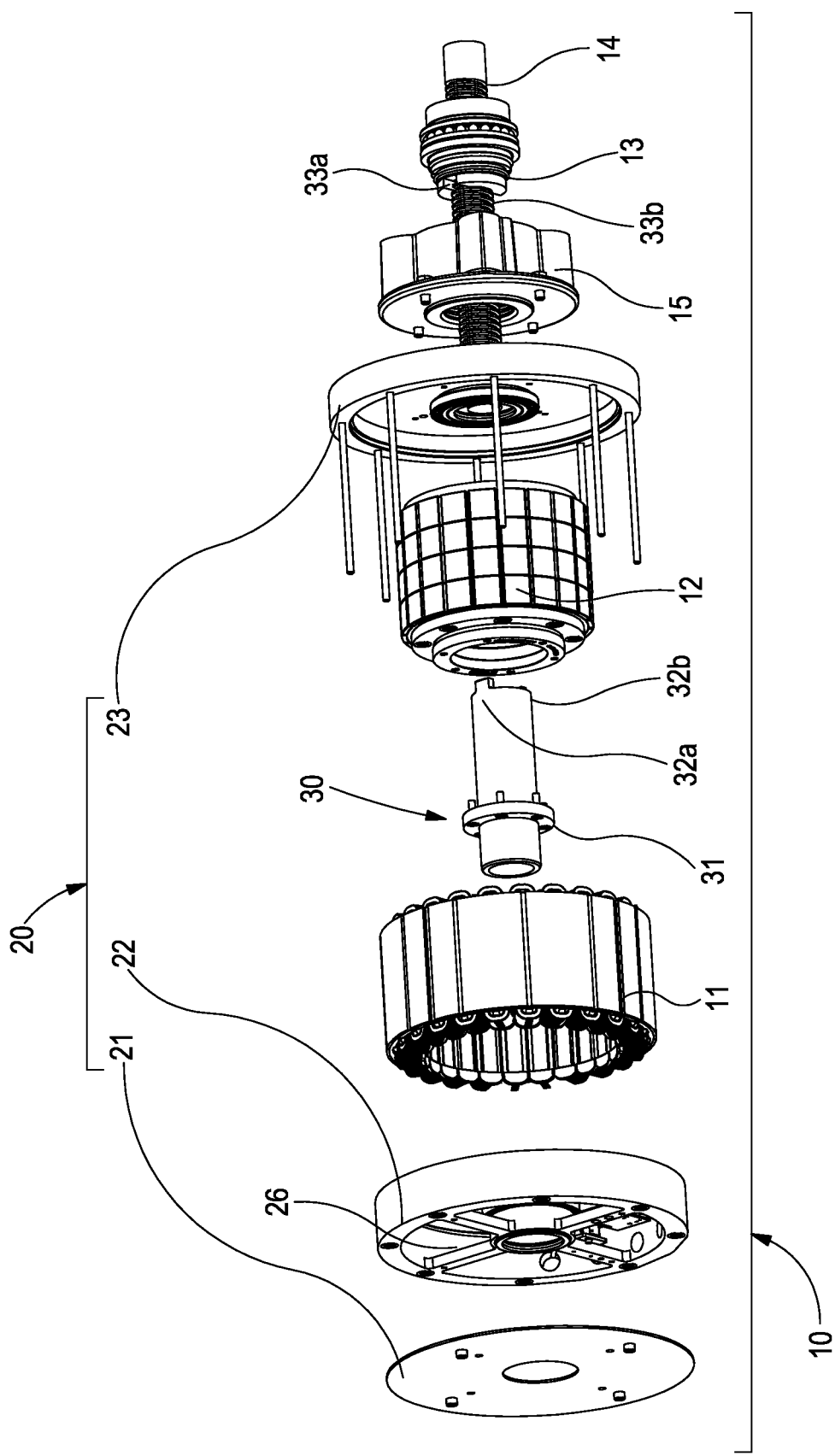
FIG. 2 illustrates an exploded view of an actuation system.

FIG. 2 illustrates an exploded view of an actuation system 10 that can be used in place of the electric motor 2 and drivetrain 3 described above in relation to FIG. 1. The actuation system 10 can be used to provide a compact electric valve actuator capable of providing sufficient torque to operate heavy-duty industrial valves without the need for a large drivetrain/gears. FIG. 2 is a simplified illustration of the actuation system 10 with components such as electronic devices, PCBs and wires omitted for clarity.

Figure 3:
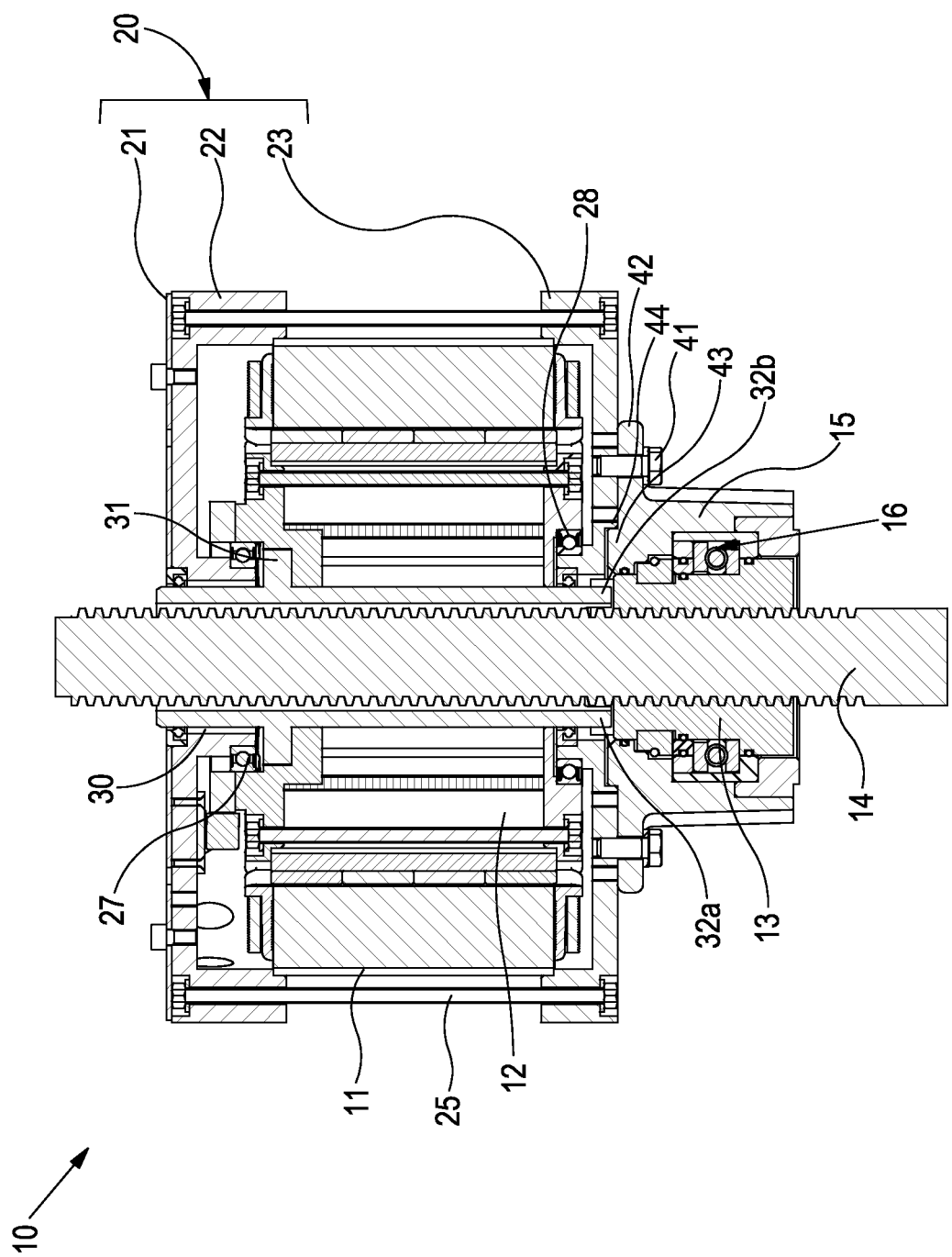
FIG. 3 illustrates a cross section view of the assembled actuation system shown in FIG. 2.
Figure 4:
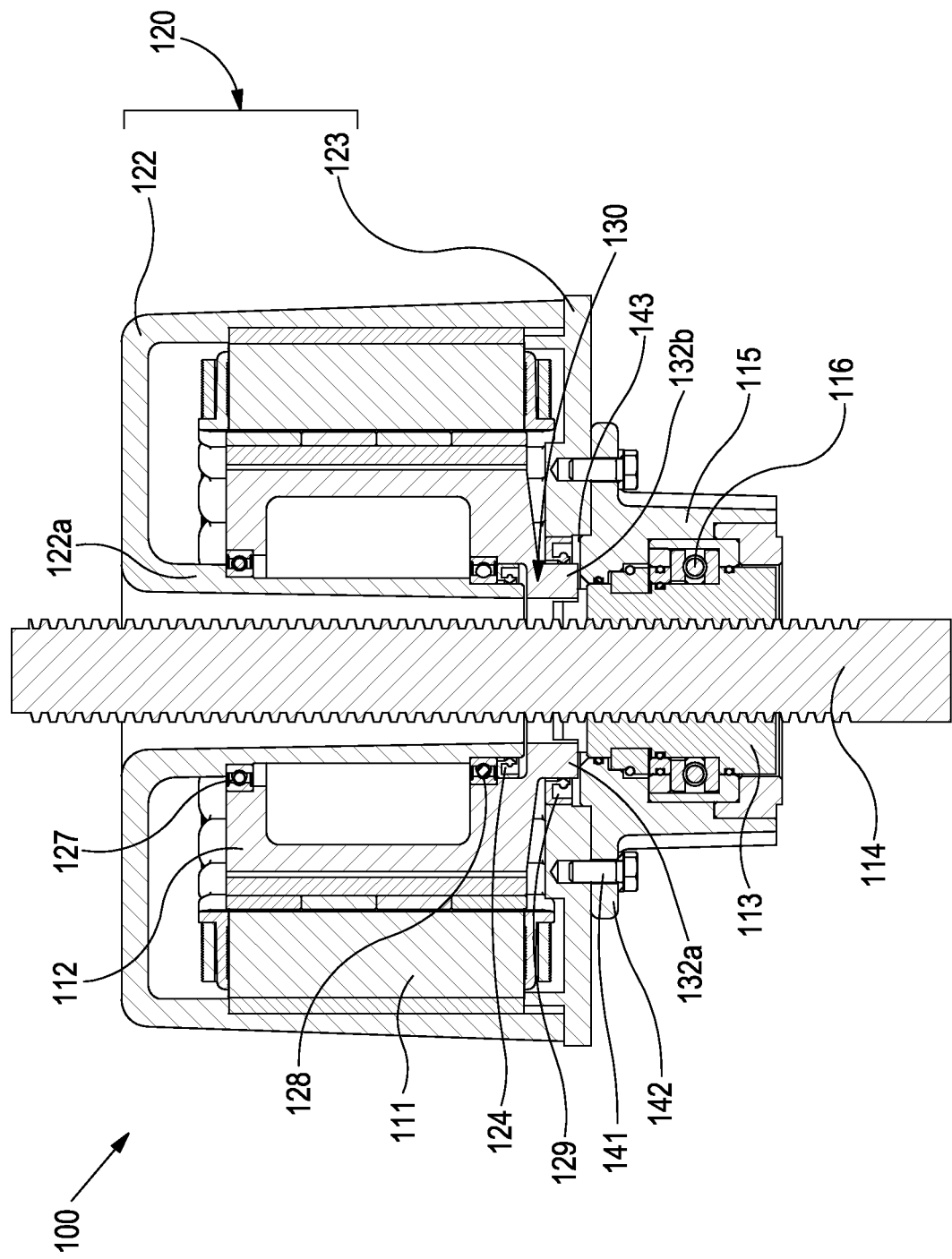
FIG. 4 illustrates a cross section view of a second actuation system.
Figure 5:
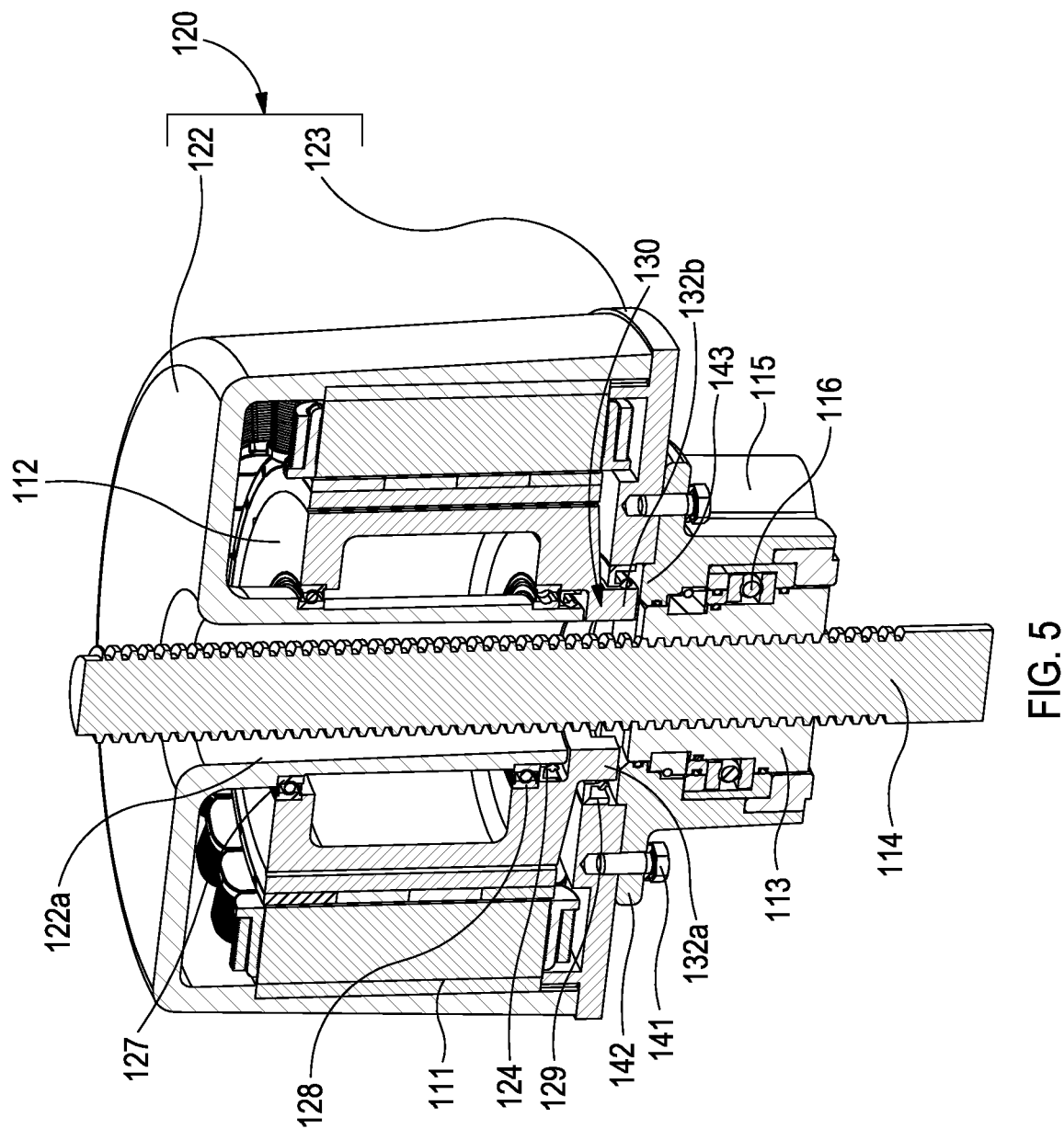
FIG. 5 illustrates a cross section perspective view of the second actuation system at an angle.
Figure 6:
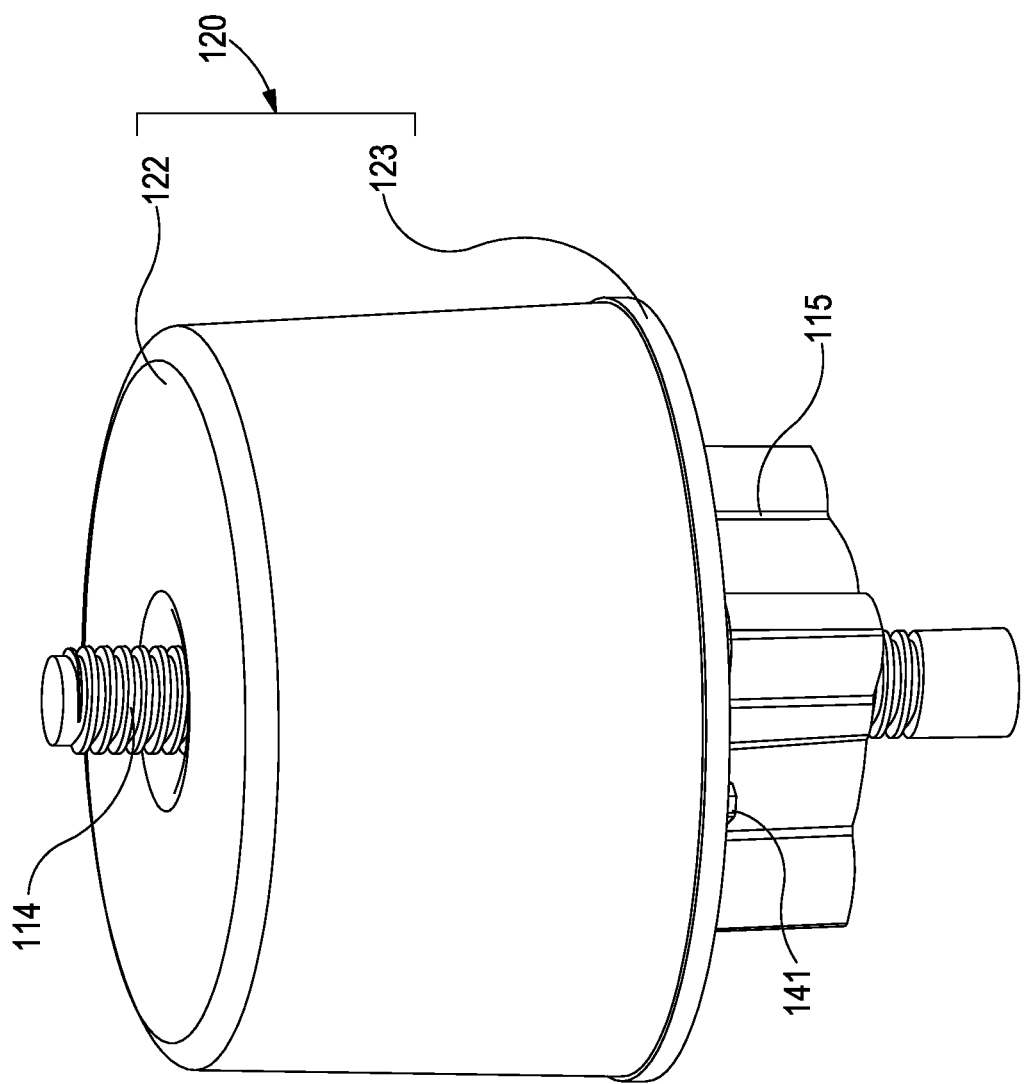
FIG. 6 illustrates the exterior of the second actuation system.

The actuation system 10 comprises an electric motor, such as a brushless DC motor or a switched reluctance motor, comprising an external stator 11 and an internal rotor 12; a motor housing 20; a hollow output shaft 30; a drive coupling 13 contained within a drive coupling housing 15; and an actuator shaft 14. As shown in FIG. 3, all of these components are arranged on a common central axis which is also the axis of rotation for the internal rotor 12, hollow output shaft 30 and drive coupling 13.

The internal rotor 12 is hollow, having a central, axially-extending bore. As shown in FIG. 3, the internal rotor 12 is substantially contained within the external stator 11 such that the inner surface of the stator 11 surrounds the outer surface of the internal rotor 12.

Both the external stator 11 and internal rotor 12 are mounted within a generally circular motor housing 20 by which the system 10 can be located in an actuator housing. The motor housing 20 comprises a base 23, a cover 22, and a lid 21, each having a central aperture. The drive coupling housing 15 is located on a lower surface of the base 23 (i.e. the external surface of the base 23/the surface of the base 23 external to the motor enclosing space of the motor housing 20). The cover 22 is held in a spaced arrangement with the base 23 by means of locating members 25 between peripheral regions of the cover 22 and base 23 so as to secure the stator 11 and rotor 12 in place within the motor housing 20. The cover 22 has open regions 26, and the lid 21 is removably fixed to the upper surface of the cover 22 (i.e. the external surface of the cover 22/the surface of the cover 22 external to the motor enclosing space of the motor housing 20) so as to close the open regions 26.

The locating members 25 can comprise threaded rods and nuts, the threaded rods extending through clearance counterbore holes in the cover 22 and base 23 of the motor housing.

The lid 21 and/or cover 22 of the motor housing 20 can provide means of attaching components (such as electronic components and cables) to the motor housing 20.

Bearings 27, 28 are provided in the cover 22 and base 23 of the motor housing 20 to allow the internal rotor 12 to be rotatable in the motor housing 20.

Alternatively, the electric motor 11, 12 can be mounted directly onto the actuator housing, instead of being mounted within the above described motor housing 20, in which case bearings would be provided in the actuator housing to allow the internal rotor 12 to be rotatable in the actuator housing.

Moreover, the stator 11 would be fixed to the actuator housing by means such as heat shrinking, bonding or mechanical key fitting(s) to prevent rotation of the stator 11 within the actuator housing.

The hollow output shaft 30 comprises a hollow cylinder having an external flange 31 protruding radially from the outer surface at its upper end region. The hollow output shaft 30 is mounted within the internal rotor 12 by means of fixing means, such as bolts, between the flange 31 and the internal rotor 12 to allow the hollow output shaft 30 to rotate with the internal rotor 12. The upper surface of the flange 31 engages the bearing 27 in the upper portion of the housing (e.g. upper portion 22 or an upper portion of the actuator housing). The lower end of the rotor 12 engages the bearing 28 in the lower portion of the housing (e.g. base 23 or a lower portion of the actuator housing). The lower end of the shaft 30 projects through the central aperture of the lower portion of the housing (e.g. base 23 or a lower portion of the actuator housing).

The drive coupling housing 15 is fixed to the lower portion of the motor housing 20 (i.e. base 23) or actuator housing around the central aperture. The drive coupling 13 is mounted for rotation in bearings 16 in the drive coupling housing 15. The hollow output shaft 30 has axially-extending lugs 32*a*, 32*b* at one end (i.e. its lower end). The lugs 32*a*, 32*b* engage in corresponding cut-outs 33*a*, 33*b* provided at one end of the drive coupling 13 such that the drive coupling 13 can rotate in the bearings 16 with the hollow output shaft 30. Alternatively, axially-extending lugs can be provided at one end of the drive coupling 13 and corresponding cut-outs can be provided at one end of the hollow output shaft 30. As such, rotation of the internal rotor 12 is transmitted to the drive coupling 13 via engagement of the lug(s) and cut-out(s) formed in respective parts of the hollow output shaft 30 and the drive coupling 13.

The drive coupling 13 comprises a drive nut having an internally threaded bore. The valve actuator shaft 14 extends through the hollow output shaft 30 and drive coupling 13 and has an external thread that engages the internal thread of the drive coupling 13. This engagement allows rotation of the drive coupling 13 relative to the actuator shaft 14 to be converted into linear movement of the shaft 14. Thus, actuation of the rotor 12 moves the actuator shaft 14 axially. If a valve is provided at one end (i.e. the lower end) of the actuator shaft 14 (e.g. wherein the actuator shaft is directly connected to the valve, or wherein the actuator shaft is a threaded valve stem comprising a valve at its lower end), the axial movement of the actuator shaft 14 in turn operates the valve allowing the electric motor 11, 12 to directly act on the valve. The pitch of the threads on the drive coupling and shaft 14 determine the degree of axial movement of the shaft per turn of the rotor 12.

As an alternative to the drive nut described above, the drive coupling 13 can be a recirculating ball screw nut or a roller screw nut. Also, the actuation system 10 can comprise an anti-back drive coupling.

As with the actuator of FIG. 1, a hand wheel (not shown) can be provided for manual operation of the valve in emergency situations (e.g. when the electric motor is malfunctioning or when no mains power is available).

FIGS. 4-8 illustrate a second, alternative actuation system 100 that can also be used in place of the system described above in relation to FIGS. 2-3. FIGS. 4-8 are a simplified illustration of the second actuation system 100 with components such as electronic devices, PCBs and wires omitted for clarity.

The second actuation system 100 comprises an electric motor comprising an external stator 111 and an internal rotor 112; a motor housing 120; a hollow output shaft 130; a drive coupling 113 contained within a drive coupling housing 115; and an actuator shaft 114, all of which are generally configured in the same manner as the system shown in FIGS. 2-3.

In the second system, the cover 122 extends from the base 123 of the motor housing around the stator 111 and rotor 112, defining an internal tube 122*a*, so as to secure the stator 111 and rotor 112 in place within the motor housing 120. The internal rotor 112 is mounted on bearings 127, 128 on the internal tube 122*a* to allow the internal rotor 112 to be rotatable within the motor housing 120. The internal rotor 112 is also mounted on a seal 124 on the internal tube 122*a* and a seal 129 in the central aperture of the lower portion of the housing (e.g. base 123 or a lower portion of the actuator housing) to allow components of the electric motor 111, 112 (e.g. stator windings of the electric motor, motor drive electronics and IGBT modules) to be sealed, for example, against potentially explosive atmospheres. Moreover, the cover 122 can have open regions, and the motor housing 120 can further comprise a lid that can be removably fixed to the upper surface of the cover 122 (i.e. the external surface of the cover 122/the surface of the cover 122 external to the motor enclosing space of the motor housing 120) so as to close the open regions 26. At least one seal can be provided between the lid and the open regions.

The cover 122 and/or lid of the motor housing 120 can provide means of attaching components (such as electronic components and cables) to the motor housing 120.

Similar to the system shown in FIGS. 2-3, the hollow output shaft 130 has axially-extending lugs 132*a*, 132*b* at one end (i.e. its lower end/the end that extends through the central aperture of the lower portion of the housing (e.g. base 123 or a lower portion of the actuator housing)) that engage in corresponding cut-outs 133*a*, 133*b* (see FIG. 8) provided at one end of the drive coupling In the systems described above, drive coupling assembly is connected to the base of the motor housing. The drive coupling assembly is also external to the motor housing as the electric motor is on one side of the base of the motor housing (i.e. on the internal side of the motor housing) and the drive coupling assembly is on the other side of the base of the motor housing (i.e. on the external side to the motor housing). The connection between the drive coupling assembly and the motor housing is releasable as the drive coupling assembly and the motor housing are connected to each other via at least one removable fixing element. For example, in compact actuation systems 10 and 100 the removable fixing elements comprise bolts 41, 141 that extend through clearance holes provided on a flange 42, 142 of the drive coupling housing 15, 115 and engage threaded holes in the base 23, 123 of the motor housing.

Figure 7:
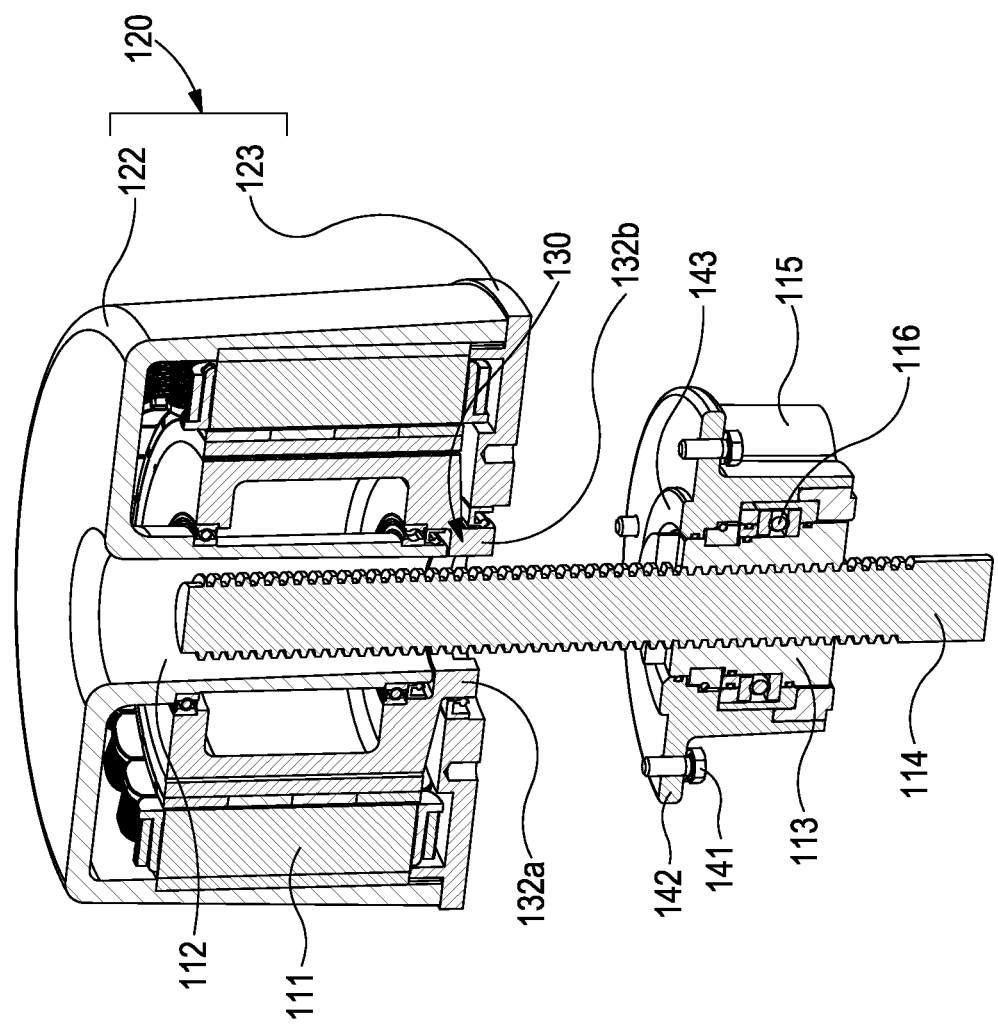
FIG. 7 illustrates a cross section view of the second actuation system in a partially-disassembled configuration.
Figure 8:
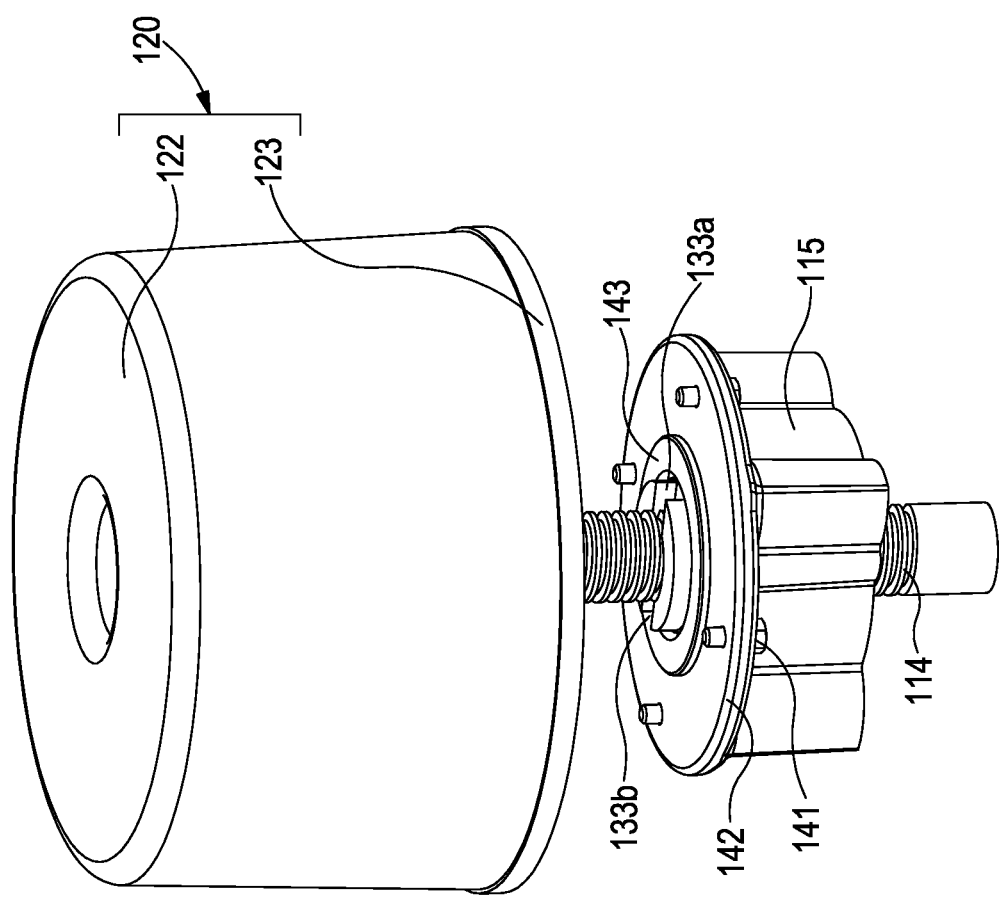
FIG. 8 illustrates the exterior of the second actuation system in the partially-disassembled configuration.

The engagement between the lug(s) and the corresponding cut-out(s) formed in respective parts of the drive coupling (i.e. drive coupling 13 or drive coupling 113) and the hollow output shaft (i.e. shaft 30 or shaft 130) allows the motor assembly to be easily moved away from the drive coupling assembly and the actuator shaft (e.g. for maintenance), as shown in FIGS. 7 and 8, as the lug(s) and cut-out(s) can be disengaged by simply moving the motor assembly axially away from the drive coupling assembly once the connection between the drive coupling assembly and the motor housing has been released. Moreover, this can be done without affecting the position of the actuator shaft (i.e. shaft 14 or shaft 114) as the actuator shaft is indirectly connected to the motor assembly via the drive coupling assembly (i.e. the engagement between the lug(s) and cut-out(s)). If a valve is provided at one end of the actuator shaft (i.e. the lower end of the actuator shaft), this means the motor assembly can be safely removed for repair or replacement without taking the valve out of service.

The drive coupling housing (i.e. drive coupling housing 15 or drive coupling housing 115) can be connected to a valve housing, within which the valve components are secured. Alternatively, the valve housing can define the drive coupling housing (i.e. drive coupling housing 15 or drive coupling housing 115).

Where the electric motor to be used with the compact actuation systems 10 and 100 is a brushless DC motor, drive electronics and IGBT (Insulated-Gate Bipolar Transistor) modules can be used to switch the current to the motor windings using pulse-width modulation (PWM) control. The IGBT modules can be arranged radially around the motor end windings and electrically connected to the motor end winding terminations.

Epoxylite® (or a similar material known in the art) can be used to substantially or completely encapsulate components of the electric motor to be used with the compact actuation system 10 and 100 (e.g. the stator windings of the electric motor, motor drive electronics and IGBT modules at the end of the motor end windings). For example, this can be achieved by using the motor housing 120 as a mould and pouring molten Epoxylite® (or a similar material) into an opening of the motor housing 120 (e.g. an opening provided between the internal rotor 112 and the base of the motor housing 123) and allowing the Epoxylite® (or a similar material) to solidify. Encapsulating the components of the electric motor in Epoxylite® (or a similar material), can allow the compact actuation system (i.e. compact actuation system 10 or 100) to be explosion proof, as the Epoxylite® (or a similar material) acts as a barrier between potentially explosive atmospheres and the encapsulated components that can be sources of spark ignition (such as the motor windings and drive electronics).

Figure 9:
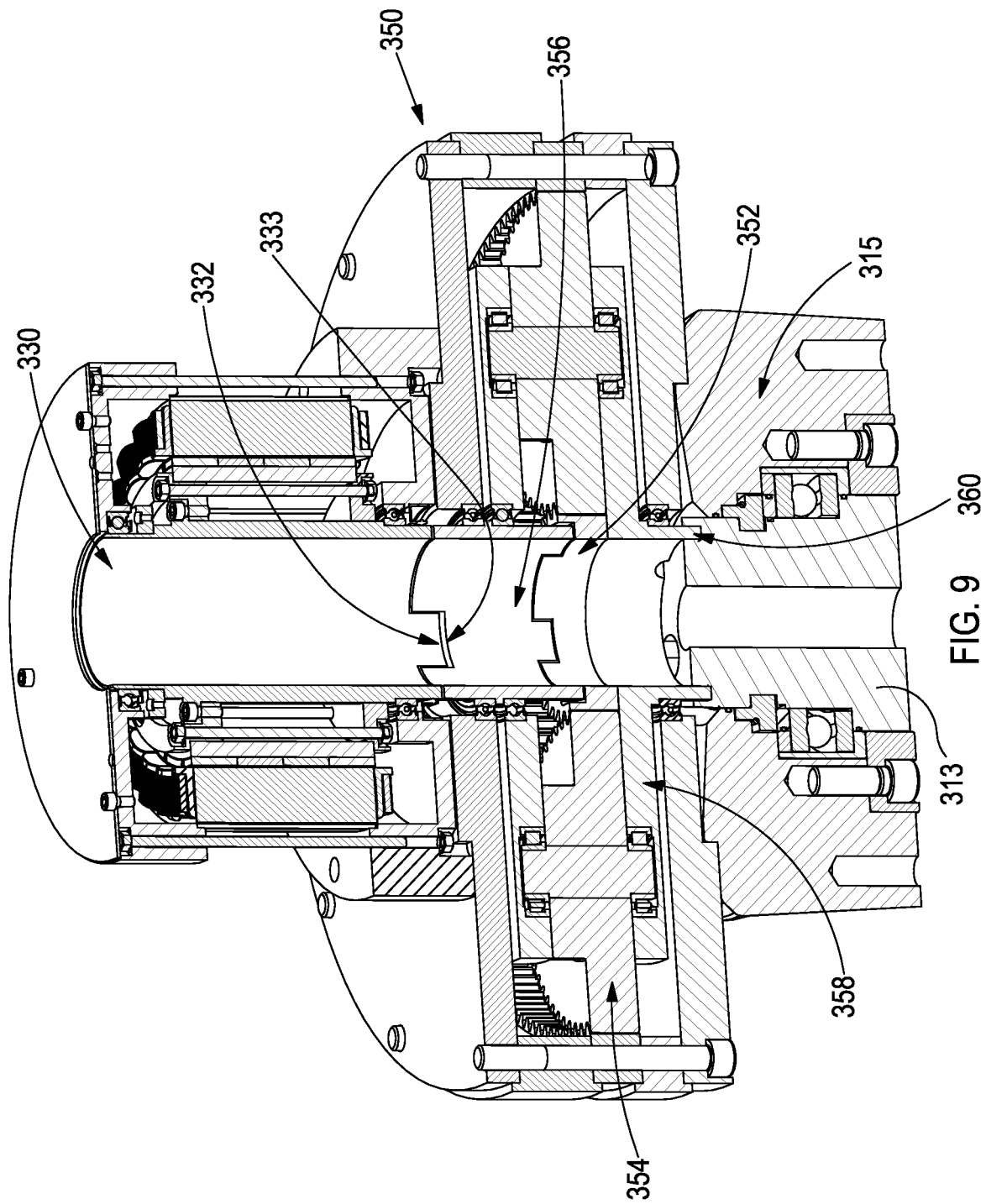
FIG. 9 illustrates a further valve actuation system including a planetary gear arrangement.

In the embodiments show in FIGS. 2-8, the hollow output shaft 30, 130 directly engages the drive coupling 13, 113. In such cases, the maximum torque that can be applied to the actuator shaft will depend on the size of the motor. For high torque applications, the size of motor necessary for direct drive may be too large to be practical. In this case, a gear arrangement can be interposed between the motor and the drive coupling. FIG. 9 illustrates an embodiment of this arrangement, which includes a gearbox 350 housing a planetary gear arrangement including a sun gear 352 and a series of planet gears 354. The sun gear 352 is hollow and is mounted concentrically with the hollow output shaft 330 and drive coupling 313 in the drive coupling housing 315 (and hence with the actuator shaft, not shown). The sun gear 352 is mounted on a sun gear carrier 356 which is mounted in bearing in the upper part of the gearbox 350 and has cut-outs 333 to receive lugs 332 on the end of the hollow output shaft 330. The planet gears 354 are mounted on a planet gear carrier 358 which rotates with the planet gears 354 and transmits the rotation to the drive coupling 313 through drive lugs 360. The motor and gearbox can be separate units so that the motor can be removed from the gearbox. Similarly, the gearbox can be removed from the drive coupling and so leave the valve in position, as is discussed above.

While FIG. 9 shows a single stage planetary gear system, it is also possible to use a multi-stage planetary gear system. For example, the planet gear carrier can be connected to a hollow sun gear of a subsequent planetary gear stage. Two or more subsequent stages can be used.

As an alternative to the planetary gearbox disclosed above, the gearbox could be spur gear type or bevel gear type with a hollow output shaft to allow the actuator shaft to rise up through the gearbox output gear. Where such a spur gear or bevel gear gearbox is used then the actuator shaft may not rise up through the hollow output shaft of the motor as the motor rotation axis may no longer be concentric with the gearbox output axis.

The direct acting motor arrangement described above, or the direct acting motor coupled to a gearbox could be used in conjunction with an anti-back drive coupling to operate a ¼ turn valve such as a ball valve or butterfly valve. This type of ¼ turn valve does not have a rising valve stem or actuator shaft. The anti-back drive coupling could potentially be left attached to the valve to maintain the position of the valve whilst the motor was removed for maintenance or replacement in a similar way to what is described above.

Figure 10:
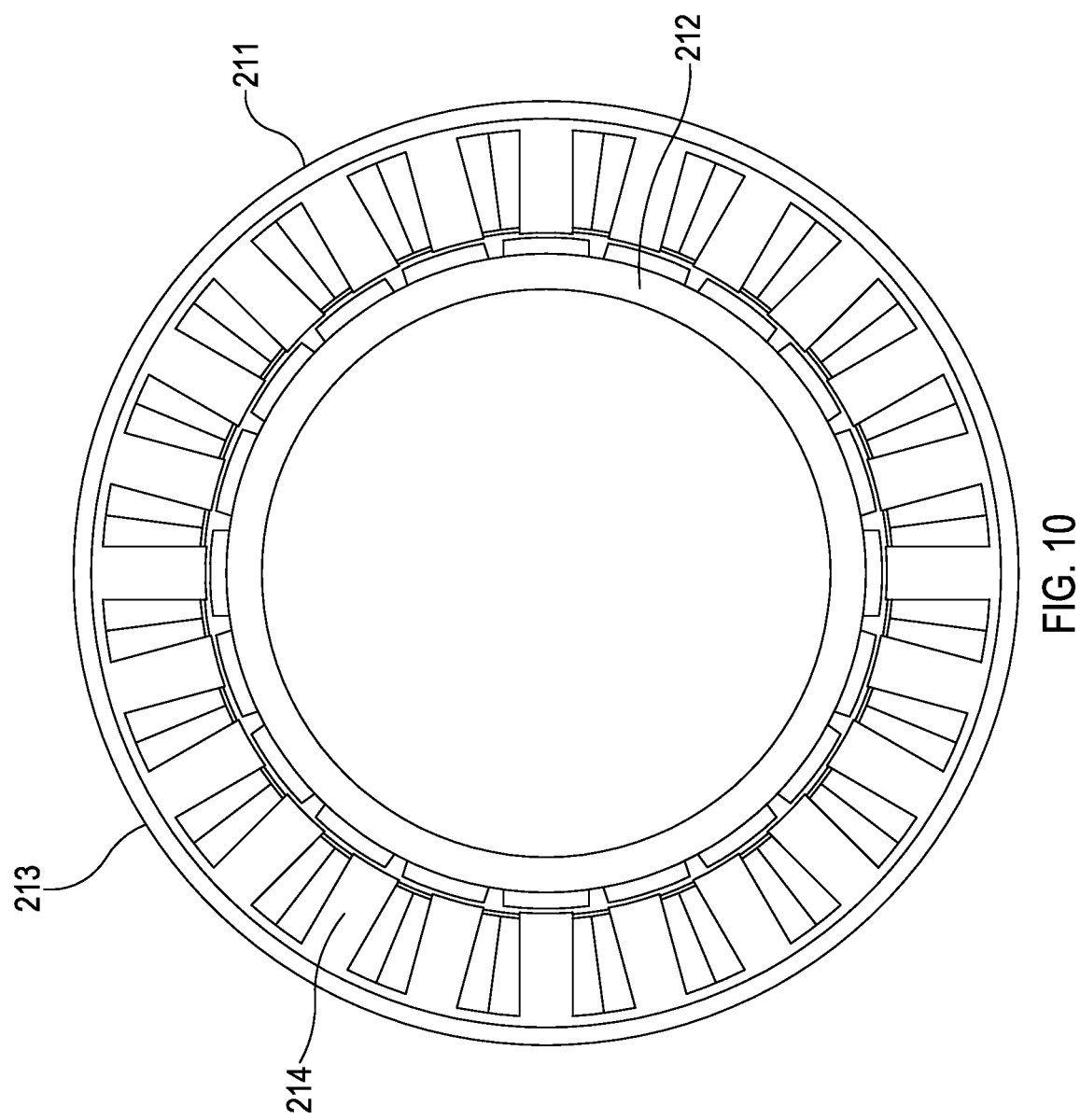
FIG. 10 illustrates a cross section view of an electric motor designed for use with a actuation system.

FIG. 10 shows a cross section view of an electric motor 211, 212 that can be used with the compact actuation systems 10 and 100 described above. The stator 211 consists of an external stator body 213 with a series of inwardly projecting stator teeth 214. The sides of the stator teeth 214 are substantially straight along the whole length of each tooth. It has previously been proposed to provide lateral extensions or tips at the end of each tooth (i.e. the sides extend laterally towards the adjacent tooth at the end). This has been done to reduce high levels of flux density in the stator leading to excess heat being generated in use. In effect, the external stator 211 has no stator tooth tips. In applications such as the valve actuator described above, the motor can have low rotational output speeds such that iron losses and heat generation are less of an issue. Also, the motor is to be operated, for example, with a 25% duty cycles rather than being rated to run continuously and the external stator 211 can be relatively large in size, relative to the motor output power, and thus has a large thermal mass that helps distribute any heat generated.

Lack of stator tooth tips on the external stator 211 can substantially simplify the coil assembly process as pre-wound concentrated 'coil packs' can be assembled onto the stator 211 by simply sliding them onto the stator teeth, as opposed to having to wind coils onto the stator 211 in situ. The process of carrying out maintenance on such a stator 211 is also simplified as said 'coil packs' can be easily removed from the stator teeth by simply sliding them away from the stator teeth. Moreover, it simplifies the design of the external stator 211 making it easier to manufacture. A motor having these features, such as a brushless DC motor or a switched reluctance motor, can find use in applications in addition to the valve actuator disclosed above. This invention extends to such uses.

Further changes can be made within the scope of this invention.

The invention claimed is:

1. An actuator, comprising:
   a motor assembly, comprising:
      a motor housing, comprising:
         a cover, and
         a base;
      an electric motor, within the motor housing, comprising:
         an external stator, and
         an internal rotor; and a hollow output shaft that is connected coaxially with the internal rotor such that rotation of the internal rotor causes a corresponding rotation of the hollow output shaft;
a drive coupling assembly directly connected to the base of the motor housing, the drive coupling assembly, comprising a drive coupling housing containing a drive coupling, wherein the drive coupling engages the hollow output shaft such that rotation of the hollow output shaft causes a corresponding rotation of the drive coupling; and
an actuator shaft that engages the drive coupling such that rotation of the drive coupling, by the hollow output shaft, causes the actuator shaft to move;
wherein the electric motor is located on one side of the base inside the motor housing and the drive coupling assembly is located on the other side of the base external to the motor housing;
wherein the connection between the drive coupling assembly and the motor housing is releasable so that the motor housing can be removed from and reattached to the drive coupling assembly;
wherein the actuator shaft extends through the hollow output shaft and the internal rotor, wherein rotation of the drive coupling causes the actuator shaft to move axially; and
wherein rotation of the internal rotor is transmitted to the drive coupling via engagement of an at least one axially extending lug and an at least one corresponding cut-out formed in respective parts of the hollow output shaft and drive coupling.

2. The actuator as claimed in claim 1, wherein the hollow output shaft directly engages the drive coupling.

3. The actuator as claimed in claim 1, wherein the hollow output shaft engages the drive coupling through an arrangement of gears.

4. The actuator as claimed in claim 3, wherein the drive coupling assembly comprises a gearbox comprising the arrangement of gears, and the gearbox is connected to the base of the motor housing.

5. The actuator as claimed in claim 4, wherein the gearbox contains a planetary gear arrangement including a sun gear and planet gears mounted on a rotary gear carrier, wherein the sun gear is hollow and coaxial with the hollow output shaft and the actuator shaft, and rotation of the hollow output shaft is transmitted to the actuator shaft by rotation of the rotary gear carrier.

6. The actuator as claimed in claim 5, wherein the planetary gear arrangement is a multi-stage planetary gear arrangement.

7. The actuator as claimed in claim 4, wherein the drive coupling comprises an anti-back drive coupling.

8. The actuator as claimed in claim 1, wherein the cover of the motor housing extends from the base of the motor housing around the stator and rotor.

9. The actuator as claimed in claim 8, wherein the cover of the motor housing defines an internal tube and the internal rotor is mounted on bearings on the tube.

10. The actuator as claimed in claim 1, wherein the cover and base of the motor housing are secured in a spaced arrangement by locating members extending between peripheral regions of the cover and base of the motor housing.

11. The actuator as claimed in claim 10, wherein bearings are provided in the cover and base of the motor housing to mount the internal rotor for rotation.

12. The actuator as claimed in claim 11, wherein the hollow output shaft has an external flange at its upper region, and the hollow output shaft is mounted within the internal rotor by means of the flange, and an upper surface of the flange engages bearings in an upper portion of the housing.

13. The actuator as claimed in claim 10, wherein the hollow output shaft is mounted within the internal rotor and extends through the internal rotor.

14. The actuator as claimed in claim 1, wherein the cover of the motor housing has open regions, the motor housing further comprising a removable lid that can be secured to the external surface of the cover of the motor housing to close the open regions.

15. An actuator, comprising:
a motor assembly, comprising:
a motor housing, comprising:
a cover, and
a base;
an electric motor, within the motor housing, comprising:
an external stator, and
an internal rotor; and
a hollow output shaft that is connected coaxially with the internal rotor such that rotation of the internal rotor causes a corresponding rotation of the hollow output shaft;
a drive coupling assembly directly connected to the base of the motor housing, the drive coupling assembly, comprising a drive coupling housing containing a drive coupling, wherein the drive coupling engages the hollow output shaft such that rotation of the hollow output shaft causes a corresponding rotation of the drive coupling; and
an actuator shaft that engages the drive coupling such that rotation of the drive coupling, by the hollow output shaft, causes the actuator shaft to move;
wherein the electric motor is located on one side of the base inside the motor housing and the drive coupling assembly is located on the other side of the base external to the motor housing;
wherein the connection between the drive coupling assembly and the motor housing is releasable so that the motor housing can be removed from and reattached to the drive coupling assembly;
wherein the actuator shaft extends through the hollow output shaft and the internal rotor, wherein rotation of the drive coupling causes the actuator shaft to move axially;
wherein the cover and base of the motor housing are secured in a spaced arrangement by locating members extending between peripheral regions of the cover and base of the motor housing, wherein bearings are provided in the cover and base of the motor housing to mount the internal rotor for rotation, and wherein the hollow output shaft has an external flange at its upper region, and the hollow output shaft is mounted within the internal rotor by means of the flange, and an upper surface of the flange engages bearings in an upper portion of the housing.

16. The actuator as claimed in claim 15, wherein the hollow output shaft directly engages the drive coupling.

17. The actuator as claimed in claim 15, wherein the hollow output shaft engages the drive coupling through an arrangement of gears.

18. The actuator as claimed in claim 17, wherein the drive coupling assembly comprises a gearbox comprising the arrangement of gears, and the gearbox is connected to the base of the motor housing.

19. The actuator as claimed in claim 18, wherein the gearbox contains a planetary gear arrangement including a sun gear and planet gears mounted on a rotary gear carrier, wherein the sun gear is hollow and coaxial with the hollow output shaft and the actuator shaft, and rotation of the hollow output shaft is transmitted to the actuator shaft by rotation of the rotary gear carrier.

20. The actuator as claimed in claim 19, wherein the planetary gear arrangement is a multi-stage planetary gear arrangement.

21. The actuator as claimed in claim 18, wherein the drive coupling comprises an anti-back drive coupling.

22. The actuator as claimed in claim 15, wherein the hollow output shaft is mounted within the internal rotor and extends through the internal rotor.

23. The actuator as claimed in claim 15, wherein the cover of the motor housing has open regions, the motor housing further comprising a removable lid that can be secured to the external surface of the cover of the motor housing to close the open regions.

24. A system comprising:
an actuator comprising:
  a motor assembly, comprising:
    a motor housing, comprising:
      a cover, and
      a base;
    an electric motor, within the motor housing, comprising:
      an external stator, and
      an internal rotor; and
    a hollow output shaft that is connected coaxially with the internal rotor such that rotation of the internal rotor causes a corresponding rotation of the hollow output shaft;
  a drive coupling assembly directly connected to the base of the motor housing, the drive coupling assembly, comprising a drive coupling housing containing a drive coupling, wherein the drive coupling engages the hollow output shaft such that rotation of the hollow output shaft causes a corresponding rotation of the drive coupling; and
  an actuator shaft that engages the drive coupling such that rotation of the drive coupling, by the hollow output shaft, causes the actuator shaft to move,
  wherein the electric motor is located on one side of the base inside the motor housing and the drive coupling assembly is located on the other side of the base external to the motor housing;
  wherein the connection between the drive coupling assembly and the motor housing is releasable so that the motor housing can be removed from and reattached to the drive coupling assembly; and
  wherein the actuator shaft extends through the hollow output shaft and the internal rotor, wherein rotation of the drive coupling causes the actuator shaft to move axially; and
  wherein rotation of the internal rotor is transmitted to the drive coupling via engagement of an at least one axially extending lug and an at least one corresponding cut-out formed in respective parts of the hollow output shaft and drive coupling; and
a valve connected to the actuator.

25. The system as claimed in claim 24, wherein the actuator shaft is directly connected to the valve.

26. A system comprising:
an actuator comprising:
  a motor assembly, comprising:
    a motor housing, comprising:
      a cover, and
      a base;
    an electric motor, within the motor housing, comprising:
      an external stator, and
      an internal rotor; and
    a hollow output shaft that is connected coaxially with the internal rotor such that rotation of the internal rotor causes a corresponding rotation of the hollow output shaft;
  a drive coupling assembly directly connected to the base of the motor housing, the drive coupling assembly, comprising a drive coupling housing containing a drive coupling, wherein the drive coupling engages the hollow output shaft such that rotation of the hollow output shaft causes a corresponding rotation of the drive coupling; and
  an actuator shaft that engages the drive coupling such that rotation of the drive coupling, by the hollow output shaft, causes the actuator shaft to move,
  wherein the electric motor is located on one side of the base inside the motor housing and the drive coupling assembly is located on the other side of the base external to the motor housing;
  wherein the connection between the drive coupling assembly and the motor housing is releasable so that the motor housing can be removed from and reattached to the drive coupling assembly; and
  wherein the actuator shaft extends through the hollow output shaft and the internal rotor, wherein rotation of the drive coupling causes the actuator shaft to move axially;
  wherein the cover and base of the motor housing are secured in a spaced arrangement by locating members extending between peripheral regions of the cover and base of the motor housing, wherein bearings are provided in the cover and base of the motor housing to mount the internal rotor for rotation, and wherein the hollow output shaft has an external flange at its upper region, and the hollow output shaft is mounted within the internal rotor by means of the flange, and an upper surface of the flange engages bearings in an upper portion of the housing; and
a valve connected to the actuator.

27. The system as claimed in claim 26, wherein the actuator shaft is directly connected to the valve.

* * * * *